United States Patent
Dani et al.

(10) Patent No.: US 7,386,860 B2
(45) Date of Patent: Jun. 10, 2008

(54) TYPE EXTENSIONS TO WEB SERVICES DESCRIPTION LANGUAGE

(75) Inventors: Savithri Dani, Issaquah, WA (US); Stephen P. De Jong, Bellevue, WA (US); Caleb Doise, Bellevue, WA (US); Jonathan Hawkins, Seattle, WA (US); Gopala Krishna R. Kakivaya, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 664 days.

(21) Appl. No.: 10/187,403

(22) Filed: Jun. 28, 2002

(65) Prior Publication Data

US 2004/0006651 A1    Jan. 8, 2004

(51) Int. Cl.
*G06F 9/44* (2006.01)

(52) U.S. Cl. ........................ 719/315; 719/330

(58) Field of Classification Search ................ 719/310, 719/316, 328, 315; 709/203, 225, 230, 241; 379/88.17
See application file for complete search history.

(56) References Cited

U.S. PATENT DOCUMENTS

| | | | |
|---|---|---|---|
| 6,772,216 B1* | 8/2004 | Ankireddipally et al. ... | 709/230 |
| 6,801,604 B2* | 10/2004 | Maes et al. ............... | 379/88.17 |
| 6,826,594 B1* | 11/2004 | Pettersen .................. | 709/203 |
| 6,850,979 B1* | 2/2005 | Saulpaugh et al. ......... | 709/225 |
| 6,865,608 B2* | 3/2005 | Hunter ...................... | 709/229 |
| 6,868,447 B1* | 3/2005 | Slaughter et al. .......... | 709/225 |
| 6,934,756 B2* | 8/2005 | Maes ........................ | 709/227 |
| 6,941,560 B1* | 9/2005 | Lowry et al. .............. | 719/328 |
| 7,062,570 B2* | 6/2006 | Hong et al. ................ | 709/238 |
| 7,159,007 B2* | 1/2007 | Stawikowski .............. | 709/202 |
| 7,159,224 B2* | 1/2007 | Sharma et al. ............. | 719/310 |
| 7,162,687 B2* | 1/2007 | Pelegri-Llopart et al. ..... | 715/501.1 |
| 2003/0191803 A1* | 10/2003 | Chinnici et al. ............ | 709/203 |
| 2003/0204622 A1* | 10/2003 | Blizniak et al. ............. | 709/241 |
| 2003/0204644 A1* | 10/2003 | Vincent ...................... | 709/317 |
| 2003/0220993 A1* | 11/2003 | Blizniak et al. ............. | 709/223 |

OTHER PUBLICATIONS

Christensen, E., Web Services Description Language (WSDL) 1.1, Mar. 15, 2001.
Fallside, D., XML Schema Part 0: Primer, retrieved from the Internet on May 28, 2002.
Thompson, H. et al., XML Schema Part 1: Structures, retrieved from the Internet on May 28, 2002, http://www.w3.org/TR/xmlschema-1/.
Biron, P. et al., XML Schema Part 2: Datatypes, retrieved from the Internet on May 28, 2002.

* cited by examiner

*Primary Examiner*—Van H. Nguyen
(74) *Attorney, Agent, or Firm*—Klarquist Sparkman, LLP

(57) ABSTRACT

A web service description language with object extensions provides type-centric extensions to web service description languages in order to describe and implement a type-centric, object-model agnostic, web service description. By implementing the constructs described herein, a heterogeneous distributed computing environment can implement rich type-centric services. For example, in a graph description, a type description indicates whether a type is encoded as a reference or embedded within another type. In a service reference description, a type description indicates whether a type is remoted by value or by reference. A type description indicates that a service extends another service, a service implements an interface (potentially multiple interfaces), a field of a type (including interfaces) is a reference type, a constant value field, or a bit field type that defines enumerations with associated values.

16 Claims, 19 Drawing Sheets

```
<wsdl:binding name="nmtoken" type="qname">*
    <wsdl:documentation .... />?
    <-- extensibility element --> *
    <wsdl:operation name="nmtoken">*
        <wsdl:documentation .... /> ?
        <-- extensibility element --> *
        <wsdl:input> ?
            <wsdl:documentation .... /> ?
            <-- extensibility element -->
        </wsdl:input>
        <wsdl:output> ?
            <wsdl:documentation .... /> ?
            <-- extensibility element --> *
        </wsdl:output>
        <wsdl:fault name="nmtoken"> *
            <wsdl:documentation .... /> ?
            <-- extensibility element --> *
        </wsdl:fault>
    </wsdl:operation>
</wsdl:binding>
```
⎫ 402 Binding

```
<wsdl:service name="nmtoken"> *
    <wsdl:documentation .... />?
    <wsdl:port name="nmtoken" binding="qname"> *
        <wsdl:documentation .... /> ?
        <-- extensibility element -->
    </wsdl:port>
    <-- extensibility element -->
</wsdl:service>
```
⎫ Service 404

<-- extensibility element --> *

Fig. 4

```
namespace EchoTypes
{
    ServiceClass CEchoString
    {
        string EchoString(string strval)
        {
            return "Hello";
        }
    }
}
```

Fig. 5 (Prior Art)

```xml
<?xml version='1.0' encoding='UTF-8'?>
<definitions name='CEchoString' targetNamespace='http://schemas.tempuri.org/EchoTypes'
        xmlns='http://schemas.xmlsoap.org/wsdl/'
        xmlns:tns='http://schemas.tempuri.org/EchoTypes'
        xmlns:xsd='http://www.w3.org/2001/XMLSchema'
        xmlns:xsi='http://www.w3.org/2001/XMLSchema-instance'
        xmlns:wsdl='http://schemas.xmlsoap.org/wsdl/'
        xmlns:soapenc='http://schemas.xmlsoap.org/soap/encoding/'
        xmlns:soap='http://schemas.xmlsoap.org/wsdl/soap/'>

<message name='CEchoString.EchoStringInput'>
        <part name='strval' type='xsd:string'/>
    </message>
    <message name='CEchoString.EchoStringOutput'>
        <part name='return' type='xsd:string'/>
    </message>

<portType name='CEchoStringPortType'>
        <operation name='EchoString'>
            <input name='EchoString' message='tns:CEchoString.EchoStringInput'/>
            <output name='EchoStringResponse' message='tns:CEchoString.EchoStringOutput'/>
        </operation>
    </portType>

<binding name='CEchoStringBinding' type='tns:CEchoStringPortType'>
        <soap:binding style='rpc' transport='http://schemas.xmlsoap.org/soap/http'/>

<operation name='EchoString'>
            <soap:operation soapAction='http://schemas.tempuri.org/EchoTypes/CEchoString#EchoString'/>
            <input name='EchoString'>
                <soap:body use='encoded' encodingStyle='http://schemas.xmlsoap.org/soap/encoding/' namespace='http://schemas.tempuri.org/EchoTypes/CEchoString'/>
            </input>
            <output name='EchoStringResponse'>
                <soap:body use='encoded' encodingStyle='http://schemas.xmlsoap.org/soap/encoding/' namespace='http://schemas.tempuri.org/EchoTypes/CEchoString'/>
            </output>
        </operation>
    </binding>

<service name='CEchoStringService'>
        <port name='CEchoStringPort' binding='tns:CEchoStringBinding'>
            <soap:address location='http://172.30.176.197/echostring.soap'/>
        </port>
    </service>
</definitions>
```

Fig. 6
(Prior Art)
```
<F002>
        <Bar> ..... </Bar>
</F002>
<F00>
        <Bar> ..... </Bar>
</F00>
```
Fig. 7
Prior Art
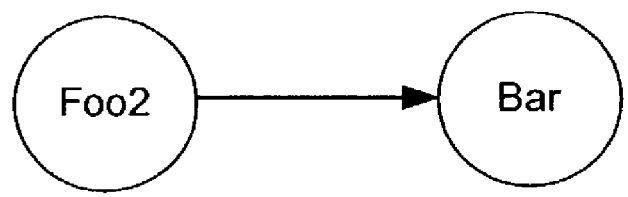
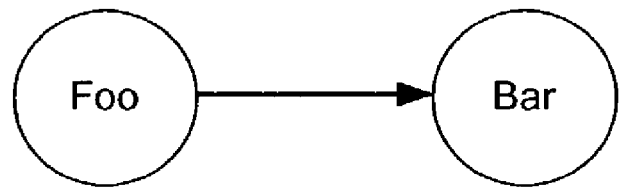

Fig. 11

```
struct WeekTime {
   int weekDay;
   int hour;
   int minute;
};

class Employee {
   string name;
   int empId;
};

class Manager : Employee {
   int mgrId;
};

class Presentation{
   Employee speaker;
   WeekTime startTime;
};
```

Fig. 12

```
<complexType name="WeekTime" ts:type="struct">
  <sequence>
    <element name="weekDay" type="xsd:int"/>
    <element name="hour" type="xsd:int"/>
    <element name="minute" type="xsd:int"/>
  </sequence>
</complexType>

<complexType name="Employee">
  <sequence minOccurs="0">
    <element name="name" type="xsd:string"/>
    <element name="empId" type="xsd:int"/>
  </sequence>
  <attributeGroup ref="ts:dataClassRefAttrs"/>
</complexType>

<complexType name="Manager">
  <complexContent>
    <extension base="Employee">
      <sequence minOccurs="0">
        <element name="mgrId" type="xsd:int"/>
      </sequence>
    </extension>
  </complexContent>
</complexType>

<complexType name="Presentation">
  <sequence minOccurs="0">
    <element name="speaker" type="ts:reference" ts:refType="tns:Employee"
        nillable="true"/>
    <element name="startTime" type="WeekTime"/>
  </sequence>
  <attributeGroup ref="ts:dataClassRefAttrs"/>
</complexType>
```

Fig. 13

```
<complexType name="ServiceReference">
  <sequence minOccurs="0">
    <element name="primaryUrl" type="xsd:anyURI"/>
    <element name="alternateUrls" type="ts:Array" ts:arrayType="xsd:anyURI[]"
        minOccurs="0" maxOccurs="1" nillable="true"/>
    <element name-"serviceID" type="xsd:anyURI" minOccurs="0" maxOccurs="1"
        nillable="true" />
    <element name="typeInfo" type="ts:TypeInfo" minOccurs="0" maxOccurs="1"
        nillable="true" />
    <element name="extensions" type="ts:array" ts:arrayType="xsd:anyType[]"
        minOccurs="0" maxOccurs="1" nillable="true" />
  </sequence>
  <attributeGroup ref="ts:dataClassRefAttrs"/>
</complexType>
<element name="ServiceReference" type="ts:ServiceReference"
    substitutionGroup="ts:anyValueElement"/>

<complexType name="TypeInfo">
  <sequence minOccurs="0">
    <element name="serviceClassName" type="xsd:QName" minOccurs="0" maxOccurs="1"
        nillable="true" />
    <element name="extends" type="ts:Array" ts:arrayType="xsd:QName[]" minOccurs="0"
        maxOccurs="1" nillable="true" />
    <element name="implements" type="ts:Array" ts:arrayType="xsd:QName[]"
        minOccurs="0" maxOccurs="1" nillable="true" />
  </sequence>
  <attributeGroup ref="ts:dataClassRefAttrs"/>
</complexType>
<element name="TypeInfo" type="ts:TypeInfo" substitutionGroup="ts:anyValueElement"/>

<complexType name="KeyValueExtension">
  <sequence>
    <element name="extensionKey" type="xsd:anyURI"/>
    <element name="extensionValue" type="xsd:anyType" nillable="true" />
  </sequence>
</complexType>
<element name="KeyValueExtension" type="tns:KeyValueExtension"
    substitutionGroup="ts:anyValueElement"/>
```

Fig. 14

```
<wsdl:definitions name="nmtoken"? targetNamespace="uri"?>
   <import namespace="uri" location="uri"/>*
   <wsdl:documentation .... /> ?
   <wsdl:types> ?
      <wsdl:documentation .... />?
      <xsd:schema .... />*
      <-- extensibility element --> *
   </wsdl:types>
   <wsdl:message name="nmtoken"> *
      <wsdl:documentation .... />?
      <part name="nmtoken" element="qname"? type="qname"?/> *
   </wsdl:message>
   <wsdl:portType name="nmtoken">*
      <wsdl:documentation .... />?
      <ts:class .../>?
      <ts:interface ... />?
      <ts:properties ... />?
      <ts:eventSources ... />?
      <xsd:element>*
      <wsdl:operation name="nmtoken">*
         <wsdl:documentation .... /> ?
         <wsdl:input name="nmtoken"? message="qname">?
            <wsdl:documentation .... /> ?
         </wsdl:input>
         <wsdl:output name="nmtoken"? message="qname">?
            <wsdl:documentation .... /> ?
         </wsdl:output>
         <wsdl:fault name="nmtoken" message="qname"> *
            <wsdl:documentation .... /> ?
         </wsdl:fault>
      </wsdl:operation>
   </wsdl:portType>
   <wsdl:binding name="nmtoken" type="qname">*
      <wsdl:documentation .... />?
      <-- extensibility element --> *
```

Fig. 15

```
<wsdl:operation name="nmtoken">*
    <wsdl:documentation .... /> ?
    <-- extensibility element --> *
    <wsdl:input> ?
        <wsdl:documentation .... /> ?
        <-- extensibility element -->
    </wsdl:input>
    <wsdl:output> ?
        <wsdl:documentation .... /> ?
        <-- extensibility element --> *
    </wsdl:output>
    <wsdl:fault name="nmtoken"> *
        <wsdl:documentation .... /> ?
        <-- extensibility element --> *
    </wsdl:fault>
  </wsdl:operation>
</wsdl:binding>
<wsdl:service name="nmtoken"> *
    <wsdl:documentation .... />?
    <wsdl:port name="nmtoken" binding="qname"> *
        <wsdl:documentation .... /> ?
        <-- extensibility element -->
    </wsdl:port>
    <-- extensibility element -->
</wsdl:service>
 <ts:values>
    <wsdl:documentation .... />?
    <-- extensibility element -->
    <ts:anyValueElement> ... </ts:anyvalueElement>*
 </ts:values>
<-- extensibility element --> *
```

Fig. 16

```
<schema xmlns:xsd="http://www.w3.org/2001/XMLSchema"
xmlns="http://www.w3.org/2001/XMLSchema"
targetNamespace="http://schemas.xmlsoap.org/wsdl/typesystem/"
xmlns:ts="http://schemas.xmlsoap.org/wsdl/typesystem/"
xmlns:tns="http://schemas.xmlsoap.org/wsdl/typesystem/"
xmlns:soap-enc="http://schemas.xmlsoap.org/soap/encoding/">
  <attribute name="enumType" type="xsd:QName" form="qualified" default="xsd:int"/>
  <attribute name="enumValue" type="xsd:int" form="qualified" />
  <attribute name="struct" type="xsd:boolean" fixed="true" form="qualified"/>
  <element name="anyValueElement" type="xsd:anyType" abstract="true" />
  <attributeGroup name="dataClassRefAttrs">
    <attribute name="id" type="xsd:ID" use="optional"/>
    <attribute name="href" type="xsd:string" use="optional"/>
  </attributeGroup>
  <complexType name="reference" final="#all">
    <attribute name="href" type="xsd:string" use="required" />
  </complexType>
  <attribute name="refType" type="xsd:string" form="qualified" />
  <complexType name="Array">
    <complexContent>
      <extension base="soap-enc:Array">
        <sequence>
          <element ref="ts:anyValueElement" maxOccurs="unbounded" />
        </sequence>
        <attributeGroup ref="ts:dataClassRefAttrs" />
        <attributeGroup ref="soap-enc:arrayAttrs" />
      </extension>
    </complexContent>
  </complexType>
  <element name="Array" type="ts:Array"
          substitutionGroup="ts:anyValueElement" />
  <attribute name="arrayType" type="string" form="qualified" />
  <attribute name="constantValue" type="xsd:string" form="qualified" />
```

Fig. 17

```
<element name="serviceClass" type="tns:serviceClass"/>
<complexType name="serviceClass">
  <sequence>
    <element name="extends" type="qname" minOccurs="0" />
    <element name="implements" type="qname" minOccurs="0" maxOccurs="unbounded" />
  </sequence>
</complexType>
<element name="interface" type="tns:serviceInterface" />
<complexType name="serviceInterface">
  <sequence>
    <element name="extends" type="qname" minOccurs="0" maxOccurs="unbounded" />
  </sequence>
</complexType>
<element name="properties" type="tns:properties"/>
<complexType name="properties">
  <sequence>
    <element ref="property" minOccurs="0" maxOccurs="unbounded"/>
  </sequence>
</complexType>
<element name="property" type="tns:property"/>
<complexType name="property">
  <sequence>
    <element name="name" type="xsd:NCName" />
    <element name="type" type="xsd:QNname" />
    <element name="get" type="xsd:NCName" minOccurs="0" />
    <element name="set" type="xsd:NCName" minOccurs="0" />
  </sequence>
</complexType>
<element name="eventSources" type="tns:eventSources"/>
<complexType name="eventSources">
  <sequence>
    <element ref="eventSource" minOccurs="0" maxOccurs="unbounded"/>
  </sequence>
</complexType>
<element name="eventSource" type="tns:eventSource"/>
<complexType name="eventSource">
  <sequence>
    <element name="name" type="xsd:NCName" />
    <element name="type" type="xsd:QName" />
  </sequence>
</complexType>
```

Fig. 18

```
<complexType name="ServiceReference">
  <sequence minOccurs="0">
    <element name="primaryUrl" type="xsd:anyURI"/>
    <element name="alternateUrls" type="ts:Array" ts:arrayType="xsd:anyURI[]"
       minOccurs="0" maxOccurs="1" nillable="true"/>
    <element name-"serviceID" type="xsd:anyURI" minOccurs="0" maxOccurs="1"
         nillable="true" />
    <element name="typeInfo" type="ts:TypeInfo" minOccurs="0" maxOccurs="1"
       nillable="true" />
    <element name="extensions" type="ts:array" ts:arrayType="xsd:anyType[]"
       minOccurs="0" maxOccurs="1" nillable="true" />
  </sequence>
  <attributeGroup ref="ts:dataClassRefAttrs"/>
</complexType>
<element name="ServiceReference" type="ts:ServiceReference"
     substitutionGroup="ts:anyValueElement"/>

<complexType name="TypeInfo">
  <sequence minOccurs="0">
    <element name="serviceClassName" type="xsd:QName" minOccurs="0" maxOccurs="1"
       nillable="true" />
    <element name="extends" type="ts:Array" ts:arrayType="xsd:QName[]" minOccurs="0"
       maxOccurs="1" nillable="true" />
    <element name="implements" type="ts:Array" ts:arrayType="xsd:QName[]"
       minOccurs="0" maxOccurs="1" nillable="true" />
  </sequence>
  <attributeGroup ref="ts:dataClassRefAttrs"/>
</complexType>
<element name="TypeInfo" type="ts:TypeInfo" substitutionGroup="ts:anyValueElement"/>

<complexType name="KeyValueExtension">
  <sequence>
    <element name="extensionKey" type="xsd:anyURI"/>
    <element name="extensionValue" type="xsd:anyType" nillable="true" />
  </sequence>
</complexType>
<element name="KeyValueExtension" type="tns:KeyValueExtension"
     substitutionGroup="ts:anyValueElement"/>
</schema>
```

Fig. 19

```
ServiceCass Base
{
        string member = "hello";

// property
                Property Member
                {
                    get{return member;}
                    set{member = value;}
                }

// method
                string Hello(string message)
                {
                        return message;
                }
}

ServiceClass Derived : Base, IFoo
{
        // interface method
        void CallFoo(int value) {}
}

ServiceInterface IFoo
{
        void CallFoo(int value);
}
```

Fig. 20

```xml
<?xml version='1.0' encoding='UTF-8'?>
<definitions name="Base" targetNamespace="http://schemas.tempuri.org/example"
  xmlns="http://schemas.xmlsoap.org/wsdl/"
  xmlns:tns=" http://schemas.tempuri.org/example"
  xmlns:xsd="http://www.w3.org/2001/XMLSchema"
  xmlns:xsi="http://www.w3.org/2001/XMLSchema-instance"
  xmlns:ts="http://schemas.xmlsoap.org/wsdl/typesystem/"
  xmlns:wsdl="http://schemas.xmlsoap.org/wsdl/"
  xmlns:soapenc="http://schemas.xmlsoap.org/soap/encoding/"
  xmlns:soap="http://schemas.xmlsoap.org/wsdl/soap/">

<message name="Base.get_Member">
  </message>
  <message name="Base.get_MemberResponse">
    <part name="return" type="xsd:string" />
  </message>
  <message name="Base.set_Member">
    <part name="value" type="xsd:string" />
  </message>
  <message name="Base.set_MemberResponse">
  </message>
  <message name="Base.Hello">
    <part name="message" type="xsd:string" />
  </message>
  <message name="Base.HelloResponse">
    <part name="return" type="xsd:string" />
  </message>
  <portType name="Base">
    <ts:serviceClass/>
    <ts:properties>
      <ts:property>
         <name>Member</name>
         <type>xsd:string</type>
         <get>get_Member</get>
         <set>set_Member</set>
      </ts:property>
    </ts:properties>
    <operation name="Hello" parameterOrder="message">
      <input name="Hello" message="tns:Base.Hello" />
      <output name="HelloResponse" message="tns:Base.HelloResponse"/>
    </operation>
  </portType>
```

Fig. 21

```xml
<binding name="BaseBinding" type="tns:Base">
  <soapliteral:binding
     xmlns:soapliteral="http://schemas.microsoft.com/upnp/binding/soapliteral/1/">
       <transport>http://schemas.xmlsoap.org/soap/http</transport>
  </soapliteral:binding>
</binding>

<portType name="Derived">
   <ts:serviceClass>
      <ts:extends>tns:Base</ts:extends>
      <ts:implements>tns:IFoo</ts:implements>
   </ts:serviceClass>
</portType>
<binding name="DerivedBinding" type="tns:Base">
  <soapliteral:binding
     xmlns:soapliteral="http://schemas.microsoft.com/upnp/binding/soapliteral/1/">
       <transport>http://schemas.xmlsoap.org/soap/http</transport>
  </soapliteral:binding>
</binding>

<message name="IFoo.CallFoo">
     <part name="value" type="xsd:int" />
</message>
<message name="IFoo.CallFooResponse"/>
<portType name="IFoo">
    <ts:serviceInterface/>
     <operation name="CallFoo" parameterOrder="value">
        <input name="CallFoo" message="tns:IFoo.CallFoo" />
        <output name="CallFooResponse" message="tns:IFoo.CallFooResponse" />
     </operation>
</portType>

</definitions>
```

TYPE EXTENSIONS TO WEB SERVICES DESCRIPTION LANGUAGE

TECHNICAL FIELD

This invention relates to web services description languages, and more particularly, type extensions thereto.

BACKGROUND AND SUMMARY

The Web Services Description Language (WSDL) is an XML format for describing network services offered by a server. See http://www.w3.org/TR/2001/NOTE-wsdl-20010315. This specification assumes the reader is familiar with XML, XSD, SOAP, and WSDL. This technology space is well known and written about in the computer arts. Generally, WSDL is used to create an XML textual description of services provided by a network server and a set of operations within each service. WSDL describes the format that a client uses to request services. WSDL service description is used by the client and server to communicate in an agreed XML format. The server agrees to provide certain services only if the client sends a properly formatted XML request.

Programmers use WSDL to form proper messages and service requests, and proper message responses and service request responses. A client obtains a copy of the WSDL description, and uses the information in this file to format a conforming request. Upon receiving a compliant request, the server can complete an operation and return the results to the client in a WSDL compliant format.

In a general sense, FIG. 1 depicts how WSDL, SOAP, XSD, and XML support message passing and web services over a network 106 between computer systems 102, 104. WSDL is computing environment agnostic, meaning, so long as a client communicates in XML according to the WSDL definition, it makes little difference whether the client and server exist in compatible computing environments (e.g., COM, JAVA, CORBA, etc). Since WSDL describes a textual representation for message passing and invoking web services in XML, a WSDL compliant communication can be recognized and translated by any computer environment following the WSDL standard.

As shown in FIG. 1, XML and SOAP are specified on both computers 102, 104. However, in some cases WSDL and XSD are not specified on both computers. In one case, a client 104, may not have WSDL and XSD specified locally, as indicated by the dotted lines 108. In this case, the client 104 parses the server's 102 WSDL and XSD, and sends the server a SOAP message which corresponds with the server WSDL. In some cases, many computers access a server to parse a WSDL and/or XSD.

A WSDL document contains the following elements in the definition of network services as shown in Table 1.

TABLE 1

Types—A container for data type definitions using some type system (such as XSD).
Message—An abstract, typed definition of the data being communicated.
PortType—An abstract set of operations supported by one or more endpoints.
Binding—A concrete protocol and data format specification for a particular port type.
Port—A single endpoint defined as a combination of a binding and a network address.
Service—A collection of related endpoints.

As shown in FIGS. 2 and 3, the WSDL document structure is a set of definitions. There is a definitions element at the root 302, and definitions inside the document. The grammar of the WSDL document format is followed by the server that is providing services to its clients so as to allow any client to understand the syntax of the messages accepted by the server. As discussed in Table 1, the WSDL document may contain types 304, messages 306, port types 308, bindings 402, and services 404.

The namespace prefixes described in Table 2, along with the syntax and rules described in Table 3, are used in this specification. Namespaces are a way to uniquely identify elements and attributes within a document.

TABLE 2

| prefix | namespace URI | definition |
| --- | --- | --- |
| wsdl | http://schemas.xmlsoap.org/wsdl/ | WSDL namespace for WSDL framework. |
| soap | http://schemas.xmlsoap.org/wsdl/soap/ | WSDL namespace for WSDL SOAP binding. |
| http | http://schemas.xmlsoap.org/wsdl/http/ | WSDL namespace for WSDL HTTP GET & POST binding. |
| mime | http://schemas.xmlsoap.org/wsdl/mime/ | WSDL namespace for WSDL MIME binding. |
| soapenc | http://schemas.xmlsoap.org/soap/encoding/ | Encoding namespace as defined by SOAP 1.1 |
| soapenv | http://schemas.xmlsoap.org/soap/envelope/ | Envelope namespace as defined by SOAP 1.1 |
| xsi | http://www.w3.org/2001/XMLSchema-instance | Instance namespace as defined by XSD |
| xsd | http://www.w3.org/2001/XMLSchema | Schema namespace as defined by XSD |
| tns | (various) | The "target namespace" (tns) prefix is used as a convention to refer to the current document. |
| (other) | (various) | All other namespace prefixes are samples only. In particular, URIs starting with "http://example.com" represent some application-dependent or context-dependent URI |

TABLE 3

The syntax appears as an XML instance,
but the values indicate the data types
instead of values.
Characters are appended to elements and
attributes as follows: "?" (0 or 1), "*" (0
or more), "+" (1 or more).
Elements names ending in "..."
(such as <element...> or </element...>) indicate
that elements/attributes irrelevant to the context are being omitted.
<-- extensibility element --> is a
placeholder for elements from some "other"
namespace (like ##other in XSD).
The XML namespace prefixes (defined below)
are used to indicate the namespace
of the element being defined.
Examples starting with <?xml contain
enough information to conform to this
specification; others examples are fragments
and require additional information to
be specified in order to conform.

Using the WSDL document structure shown in FIGS. 2 and 3, and an example program ("CEchoString") shown in FIG. 4, a WSDL description of CEchoString is shown in FIG. 5.

For example, a server can publish, deliver, or otherwise make available, a copy of the WSDL description of CEchoString to a client. The client can use the description to send web service requests and responses. The client computer system includes software that sends and receives XML messages that comply with the description. The server computer system includes software that receives and sends messages according to the description. Both client and server may include software that translates the XML messages into their respective implementation environment.

Thus, a network server provides a WSDL description of the services it provides. Some of the messages sent to the server will have parameters, and some of these parameters may contain trees of objects. For example, given the XML message contained in FIG. 6, the trees of objects shown in FIG. 7 can be constructed.

The described extensions are directed towards providing type-centric descriptions to web service description languages. The extensions illustrated herein provide the constructs to describe and implement a type-centric, object-model agnostic, web service description. By implementing the constructs described herein, a heterogeneous distributed computing environment can implement rich type-centric services.

A few of the web services describable by this extended type-centric web service description language include support for representing graph data structures through its definition of the syntax for multi-reference pointers, for representing remote objects passed by-reference through its definition of service reference wire datatype, for discovering the type of a remote object at runtime through the definition of a service interface, and other type-centric constructs such as classes, interfaces, properties, events, and delegates. With this extended web service description language, a server can provide a type-centric, object-model agnostic description of a web service.

The type extensions described herein allow many added features. A few of these features are included for example purposes. In one respect, in a graph description, a type description indicates whether a type is encoded as a reference or embedded within another type. In another respect, in a service reference description, a type description indicates whether a type is remoted by-value or by-reference. In several other respects, a type description indicates that, a service extends another service, a service implements an interface (potentially multiple interfaces), or a field of a type (including interfaces) is a reference type, a constant value field, or a bit field type that defines enumerations with associated values.

In another respect, the type extensions provided the ability to define properties on types, to set enumeration values and types, to compose services including with other services, and to specify an array syntax.

Additional features and advantages will be made apparent from the following detailed description which proceeds with reference to the accompanying drawings.

BRIEF DESCRIPTION OF THE DRAWINGS

FIGS. 2-3 define the prior art web service definition language.

FIG. 4 is a program listing later described in FIG. 5 using WSDL.

FIG. 5 is a prior art web service definition of the program in FIG. 4, according to the prior art web service definition language defined in FIGS. 2 and 3.

FIG. 6 is a prior art XML expression of a tree.

FIG. 7 is a prior art diagram showing the tree defined in FIG. 6.

FIG. 11 is a program listing used in FIG. 12 to demonstrate added features of the type-centric extensions.

FIG. 12 is a description of the program in FIG. 11 using type-centric type extensions.

FIG. 13 is a schema for service reference.

FIGS. 14-15 is a web service description language including type extensions.

FIGS. 16-18 is the schema for the illustrated extensions.

FIG. 19 is an example program used in FIGS. 20-21.

FIGS. 20-21 is the web service description with object extensions for the program in FIG. 19.

DETAILED DESCRIPTION

Figure 1:
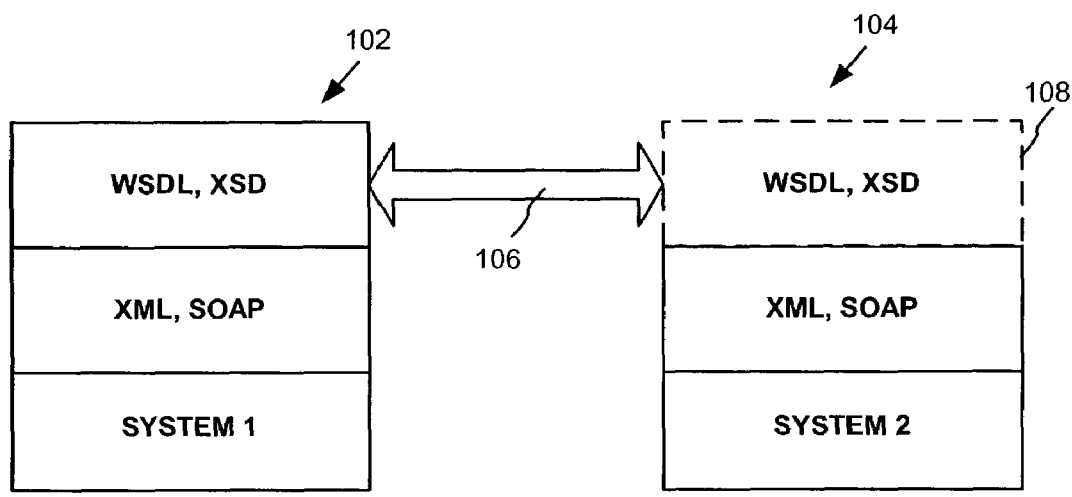
FIG. 1 is a block diagram of software layers in a prior art system.
Figure 2:
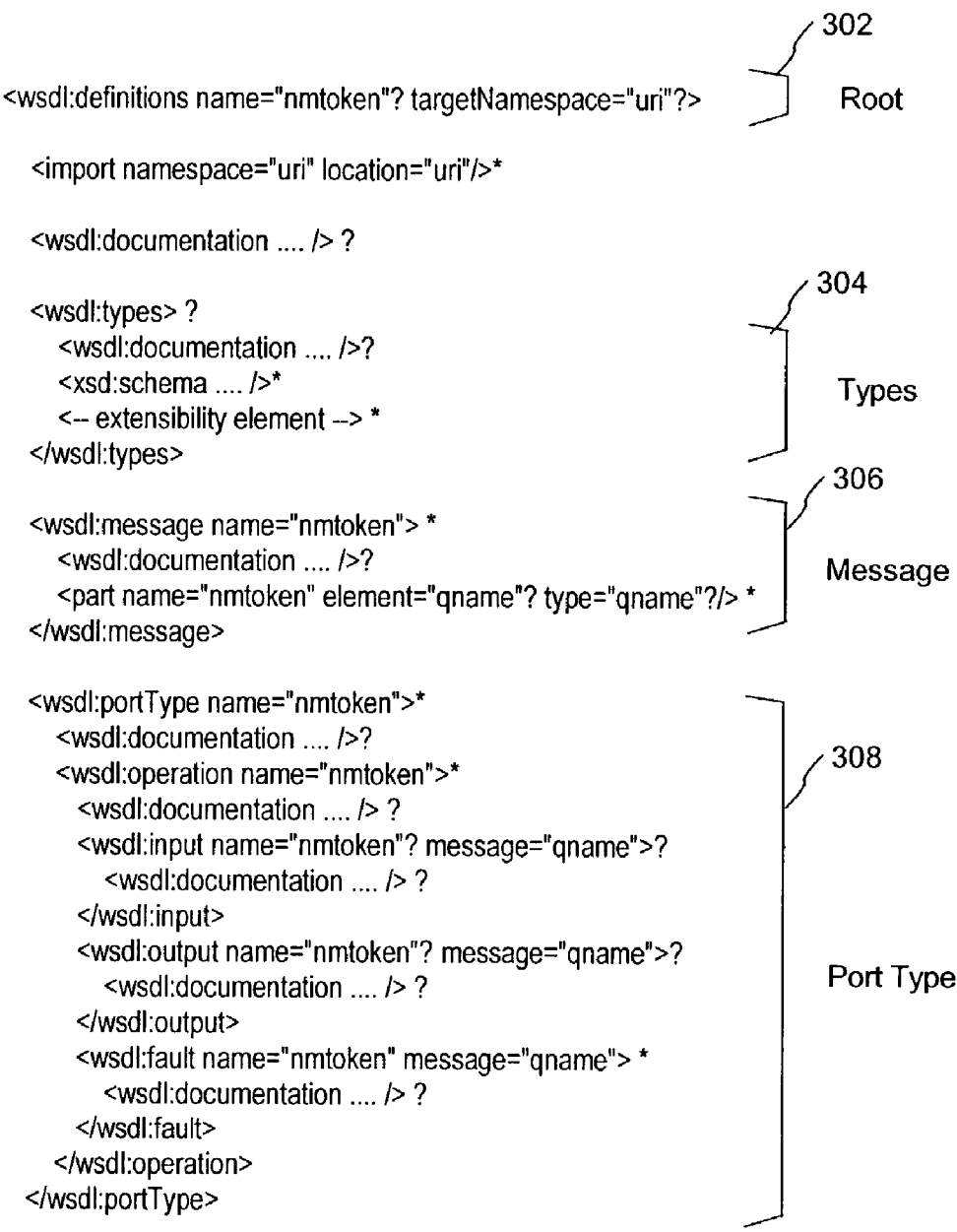
Figure 8:
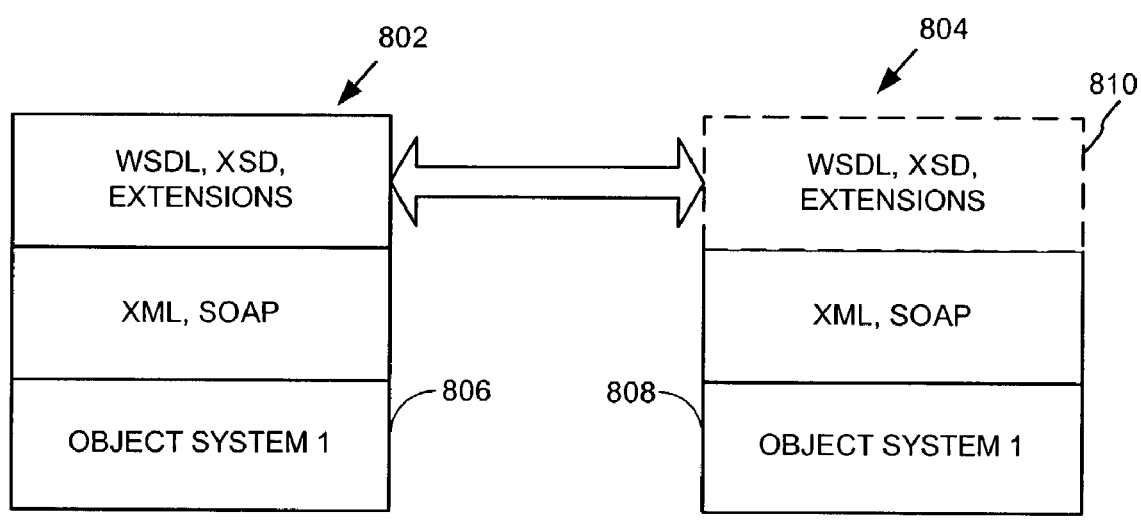
FIG. 8 is a block diagram of a system utilizing the type-centric extensions.

As shown in FIG. 8, type-centric extensions 802, 804 are added to a web services description language. In the existing WSDL model, (FIG. 1), descriptions are limited to the description capabilities of the existing definitions 102, 104. These extensions 802, 804, expand the description capabilities thereby allowing services 806, 808, to communicate in a type-centric, yet object model agnostic way.

For example, the extensions described in this document support communications between the different type-centric runtime environments such as (e.g., CLR, JAVA, COM, CORBA, etc.), so long as a mapping exists between any type system 806, and any other type system 808 through the common subset captured by the extensions described in this document. The described extensions provide a mapping between heterogeneous type systems, and between homogeneous type systems, with an agnostic description language mapping, associated schemas, and type mappings.

As shown in FIG. 8, XML and SOAP are specified on both computers 802, 804. However, in some cases EXTENSIONS, WSDL and XSD are not specified on both computers. In one case, a client 804, may not have EXTENSIONS, WSDL and XSD specified locally, as indicated by the dotted lines 810. In such a case, the client 804 parses the server's 802 EXTENSIONS, WSDL and XSD, and sends the server a SOAP message or service request which corresponds with the server's EXTENSIONS, WSDL, and XSD. In some cases, many computers access a server to parse EXTENSIONS, WSDL and/or XSD.

Figure 9:
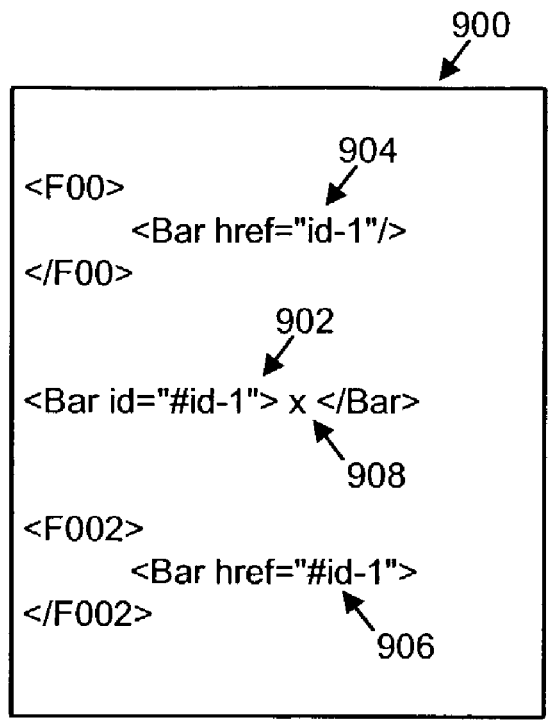
FIG. 9 is an XML expression of a graph of objects and references thereto.
Figure 10:
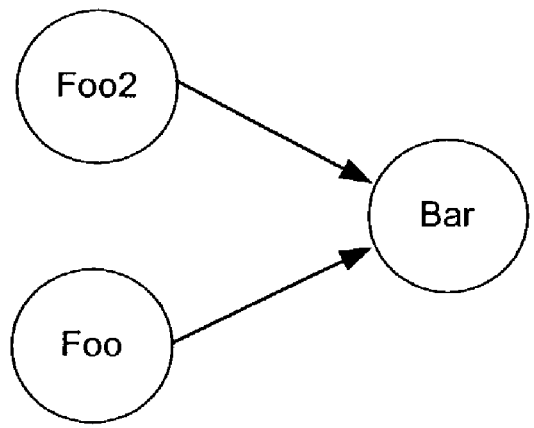
FIG. 10, is a graph of FIG. 9.

The constructs provide the capacity for a literal translation across type systems, and for introducing type system description completeness. For example, FIG. 9 includes typed objects with unique object references. Using the unique identifier, an object graph 900, can be represented indicating that two objects hold references 904, 906, to the same typed object 902. The graph is represented in FIG. 10. Thus a reference to typed object (e.g., bar) from either object holding the unique reference (e.g., foo and foo2), will access the same data 908.

In order to provide a description environment capable of describing a type-centric network services, extensions are added as described herein. These extensions will be described in the "ts" namespace using the "xmlns:ts" prefix and the http://schemas.xmlsoap.org/wsdl/typesystem/ namespace identifier. The resulting language and schema is general enough to create an object model agnostic description of multiple object systems.

SOAP Literal Encoding

The original WSDL binding section specifies two types of WSDL encodings, literal and encoded. This specification introduces a third type of encoding called SoapLiteral. SoapLiteral is similar to literal in that WSDL specifies the exact XML produced. It is similar to encoded in that it produces SOAP that conforms to Section 5 of the SOAP Specification. See http://schemas.xmlsoap.org/soap/encoding/.

SoapLiteral encoding eliminates redundant XML representations for similar concepts. Table 4 describes the redundant XML representation eliminated by the SoapLiteral binding.

TABLE 4

Avoids multiple ways of representing fields: attributes vs. elements. Use element representation.
Avoids global element name-type name distinction. For every type, it allows definition of a single global element name in its schema namespace that has the same name as the type.
Avoids using element substitution groups while representing fields of structs or classes.

TABLE 4-continued

Uses element substitution groups to represent the elements of composite types without fields, e.g. collections, arrays.
Avoids Choice grouping construct. Subtyping can be utilized to achieve functionality provided by it with a slight loss of strong typing at schema validation time.
Classes will only include the class methods in their portType. If the class implements interfaces, the portType associated with the interface will contain the interface methods.

The schema types defined inside the types section of the WSDL document conforms to the above rules when SoapLiteral encoding is specified for a portType. In addition, the SoapAction "http" header is defined to be the fully qualified portname, followed by the '#' character, followed by the method name (e.g., porttype#methodname).

SoapLiteral binding defines a single element called "binding" that has one or more child elements called "transport" that specify the transports supported by the port. Further, all methods of the supplied porttype, should be equally accessible using SoapLiteral binding rules. For example, the binding fragment in Table 5 shows a stock quote binding accessible over "http" using SoapLiteral binding:

TABLE 5

```
<binding name="StockQuoteSoapBinding"
    type="defs:StockQuotePortType">
    <soapliteral:binding xmlns:soapliteral=
    "http://schemas.xmlsoap.org/wsdl/typesystem/soapliteral/">
        <transport>http://schemas.xmlsoap.org/soap/http</transport>
    </soapliteral:binding>
</binding>
```

Types

Simple Types

The "ts" base definition directly uses the primitive types contained in the XSD schema namespace.

Enum and Bit Fields

Enumeration type is a value type based on one of the integer primitive types. It consists of a set of named elements. Values of an enumeration type typically consist of a consecutive range of integers starting at zero. It is also possible to specify the integer value associated with a specific element name, in which case the values of successors to that element are successors of that integer value.

The XSD enumeration facet is used to represent enumeration type in terms of the element names as shown in Table 6.

TABLE 6

```
<simpleType name="user-defined enum type name" ts:enumType="xsd:QName">
    <restriction base="xsd:string">
        <enumeration value="user-defined name" ts:enumValue="user-defined value"? />
        ...
    </restriction>
</simpleType>
```

As shown in Table 6, "ts:enumType" is an annotation on the type and gives the base integer type associated with the type; "ts:enumType" is defined as a global attribute in the "ts" schema namespace as, <attribute name="enumType" type="xsd:QName" form="qualified" default="xsd:int"/>.

As specified by the above schema, unless explicitly qualified with "ts:enumType", an enumeration's type will default to "xsd:int". Of course this is implementation specific, and other defaults may apply in another implementation.

A "ts:enumValue" is another global attribute that allows the explicit setting of the integer value corresponding to the element name, <attribute name=enumValue type="int" form="qualified"/>.

For example, given, enum Color={red=1,green, blue}, its representation would appear as shown in Table 7.

TABLE 7

```
<simpleType name="Color">
    <restriction base="xsd:string">
        <enumeration value="red" ts:enumValue="1"/>
        <enumeration value="green"/>
        <enumeration value="blue"/>
    </restriction>
</simpleType>
```

When an "ts:enum Value" is not explicitly specified, the value is implicitly one greater than the predecessor or 0 if it is the first enumeration.

A bit field is a mathematical powerset on the values of its base type. In other words, a bit field is a special type of enumeration, in which the enumValues are powers of two rather than succeeding integers. The base type itself is an enumeration of named elements, where each element has an associated value of an integer type. A value of a bit field type is an XSD "list" type, and contains a combination of one or more elements of the base enumeration type. A bit field is represented as shown in Table 8.

TABLE 8

```
<simpleType name="user-defined type name" ts:enumType="qname">
    <list>
        <simpleType>
            <restriction base="string">
                <enumeration value="user-defined name"
                    ts:enumValue="user-defined value"? />
                . . .
            </restriction>
        </simpleType>
    </list>
</simpleType>
```

For example, for a bit field specified as, [Flags] enum Color {red=1,green=2, blue=8}, its representation would appear as shown in Table 9.

TABLE 9

```
<simpleType name=Color>
    <list>
        <simpleType>
            <restriction base="xsd:string">
                <enumeration value="red" ts:enumValue="1"/>
                <enumeration value="green" ts:enumValue="2"/>
                <enumeration value="blue" ts:enumValue="8"/>
            </restriction>
```

TABLE 9-continued

```
        </simpleType>
    </list>
</simpleType>
```

Additionally, if an element "cc" of type "Color" had the value of "red|green" (both "red" and "green" bits are on simultaneously), the data appears as a space separated list of values (e.g., <cc>red green</cc>).

Structures and Data-Classes

Aggregate data types are of two types: struct or data-class. The "ts:struct" attribute differentiates between structures and data-classes. A struct is used when all field values are to be encoded in-line and it cannot be referenced from elsewhere in the XML document. A data-class is used when, due to the potential for circular references in the data, it can be referenced from other parts of the XML document. In other words, struct is a value type where as a data-class is a reference type. Further, data-classes support inheritance.

A structure is a composite value type that is a collection of named fields that are themselves of any simple or composite type. The fields of a structure can be accessed using their names. In this implementation, there can't be references to a struct as it is a value type and a structure can't extend another type. The XSD complexType is used to represent a "ts" structure as shown in Table 10,where "ts:struct" is a global attribute defined in the ts namespace defined as, <attribute name="struct" type="xsd:boolean" fixed="true" form="qualified"/>.

TABLE 10

```
<complexType name="struct name" ts:struct="true">
    <sequence>
        <element name="field name" type"field type"/>
        ...
    </sequence>
</complexType>
```

Since a struct is a value type that cannot be referenced, the schema fragment does not have the id attribute. Of course these are implementation details that may be varied.

For every struct definition, a corresponding global element is defined in the same namespace as the struct definition namespace. This global element has the same name as the struct name as shown in Table 11,where "anyValueElement" is defined as a global element in the "ts" namespace as <element name="anyValueElement" type="xsd:anyType" abstract="true"/>. The substitution group is useful when the struct appears as the element type of an array.

TABLE 11

```
<element name="struct name" type="tns:struct name"
    substitutionGroup="ts:anyValueElement"/>
```

A data-class is a multi-reference composite type that is a collection of named fields that are themselves of any simple or composite type. The fields of a data-class can be accessed using their names. A data-class can specify type inheritance, in which case it inherits all the fields specified in the base data-class. Unlike a struct, a data-class is reference type. In Table 12, an attribute group in the "ts" namespace is defined to support referencing of data-class instances.

TABLE 12

```
<attributeGroup name="dataClassRefAttrs">
    <attribute name="id" type="xsd:ID" use="optional"/>
    <attribute name="href" type="string" use="optional"/>
</attributeGroup>
```

The id attribute allows a data-class instance to be identified so that it can be referred to by other entities. The href attribute allows a reference field to point to a data-class instance stored in the field.

Data-classes are of two types: single-reference and multi-reference. Single-reference data-class instances can be referenced by only one field within a context, resulting in tree semantics. This permits many optimizations, such as in-line representation and not detecting aliasing. Multi-reference data-class instances can be referenced by more than one field within a context, resulting in graph semantics. As such, multi-reference is the general case. For example, data-class instances involving circular references can only be represented using multi-reference semantics. Of course these limitations are merely implementation specific.

A multi-reference data-class which is not derived from another type (not a subtype) can be represented as shown in Table 13.

TABLE 13

```
<complexType name="dataclass name">
    <sequence minOccurs="0">
        <element name="field name" type="field type"/>
        ...
    </sequence>
    <attributeGroup ref="ts:dataclassRefAttrs"/>
</complexType>
```

For every data-class definition, a corresponding global element is defined in the same namespace as the data-class definition namespace. This global element has the same name as the data-class name:

<element name="data-class name" type="tns:data-class name" substitutionGroup="ts:anyValueElement"/>.

The anyValueElement is as defined earlier in the "structure" section. The substitution group is useful when the data-class instance appears as an element inside an array. The minOccurs="0" on the sequence element ensures that the above element can refer to a "dataClass name" instance by simply using the href attribute with empty content and still be schema-valid.

A multi-reference data-class which derives from another data-class (which must also be a multi-reference data-class) is represented as shown in Table 14.

TABLE 14

```
<complexType name="data-class name">
    <complexContent>
        <extension base="base data-class name">
            <sequence minOccurs="0">
                <element name="field name" type="field type"/>
                ...
            </sequence>
        </extension>
    </complexContent>
```

TABLE 14-continued

```
</complexType>
<element name="data-class name" type="tns:data-class name"
    substitutionGroup="ts:anyValueElement"/>
```

A single-reference data-class which is not derived from another type is represented as shown in Table 15.

TABLE 15

```
<complexType name="data-class name">
    <sequence>
        <element name="field name" type="field type"/>*
    </sequence>
</complexType>
<element name="data-class name" type="tns:data-class name"
    substitutionGroup="ts:anyValueElement"/>
```

The difference between a single-reference data-class and a structure is that by definition a structure cannot be referenced, while a data-class can be referenced and the reference can be null. Also, notice the absence of minOccurs="0" attribute on the sequence element and reference to the dataClassRefAttr attribute group.

When the single-reference data-class derives from a base type, it is represented as shown in Table 16.

TABLE 16

```
<complexType name="data-class name">
    <complexContent>
        <extension base="base class name">
            <sequence>
                <element name="field name" type="field type"/>
                ...
            </sequence>
        </extension>
    </complexContent>
</complexType>
<element name="data-class name" type="tns:data-class name"
    substitutionGroup="ts:anyValueElement"/>
```

The single-reference/multi-reference aspect of a type must be the same for every data-class within a hierarchy.

Fields

A struct or a data-class field is completely defined by the field name and its type. Fields can be represented as elements of the XSD complex type representing the enclosing composite type.

If a field has a unique (single) reference to an instance of a type that cannot be null (e.g. struct), it is represented as, <element name="field name" type="fieldType"/>. This is the form used to define value-type fields.

If a field has a unique (single) reference to an instance of a type that can be null (e.g. data-class), it is represented as, <element name="field name" type="fieldType" nillable="true"/>.

If a field has a multi (shared) reference to an instance of a type (e.g. data-class), it is represented as, <element name="field name" type="ts:reference" ts:refType="fieldType" nillable="true"/>.

The "ts:reference" is defined as a complex XSD type in the "ts" namespace as shown in Table 17.

TABLE 17

```
<complexType name="reference" final="#all">
    <attribute name="href" type="xsd:string" use="required"/>
</complexType>
```

The "ts:refType" is a global attribute in the "ts" namespace defined as,
    <attribute name="refType" type="xsd:string" form="qualified"/>.

Thus, in the element declaration of a multi-reference field, the "type" of the field captures the reference aspect of the field and the "ts:refType" captures the real type of the field.

Since type inheritance affects the data corresponding to the field at runtime, it is necessary that the xsi:type attribute be specified with the instance data whenever the type of a field is a subtype.

In order to discuss an example using structs, data-classes, and their fields, the representation of the program segment shown in FIG. 11 is considered. Using the discussed type-centric extensions, the objects shown in FIG. 11 are represented as shown in FIG. 12.

Next, consider two employees XX and YY, where XX is a regular employee and YY is a manager. Their representation would be as shown in Table 18.

TABLE 18

```
<Employee id="XX-ID">
    <name>XX</name>
    <empId>1</empId>
</Employee>
<Manager id="YY-ID">
    <name>YY</name>
    <empId>1</empId>
    <mgrId>1</mgrId>
</Manager>
```

Notice that each has been given a unique "id" attribute as specified by the <attributeGroup ref="ts:data-classRefAttrs"/> in their respective schemas. Also notice that YY is an extension of XX (a Manager is-a Employee).

Further, if XX is a speaker on Wednesday at 10.00 a.m., the presentation data is represented as shown in Table 19.

TABLE 19

```
<Presentation>
    <speaker href="#XX-ID"/>
    <startTime>
        <weekDay>2</weekDay>
        <hour>10</hour>
        <minute>2</minute>
    </startTime>
</Presentation>
```

Since "speaker" is a multi-reference field, it references the "speaker" instance, whereas the "startTime" (struct) data appears inline.

If YY is the speaker, the "speaker" would appear with the instance type as shown in Table 20.

TABLE 20

```
<Presentation>
    <speaker href="#YY-ID"/>
    <startTime>
        <weekDay>2</weekDay>
```

TABLE 20-continued

```
        <hour>10</hour>
        <minute>2</minute>
    </startTime>
</Presentation>
```

However, if "speaker" has been declared as a single reference field which is nullable, the schema fragment defining "Presentation" would be as shown in Table 21.

TABLE 21

```
<complexType name="Presentation">
    <sequence minOccurs="0">
        <element name="speaker"
            type="tns:Employee" nillable="true"/>
        <element name="startTime" type="tns:WeekTime"/>
    </sequence>
    <attributeGroup ref="ts:dataClassRefAttrs"/>
</complexType>
```

Note the change in the speaker field declaration element compared to its previous in FIG. 12. Speaker is now represented in-line since it is a single reference.

If XX is the speaker on Wednesday at 10.00 a.m., the "Presentation" data would appear as shown in Table 22.

TABLE 22

```
<Presentation>
    <speaker>
        <name>XX</name>
        <empId>1</empId>
    </speaker>
    <startTime>
        <weekDay>2</weekDay>
        <hour>10</hour>
        <minute>2</minute>
    </startTime>
</Presentation>
```

Since "Presentation" has only single references in both "speaker" and "startTime" fields, the data for both the fields appears inline.

If YY is the speaker, the "speaker" data would appear with the instance type as shown in Table 23.

TABLE 23

```
<Presentation>
    <speaker xsi:type="tns:Manager">
        <name>YY</name>
        <empId>1</empId>
        <mgrId>1</mgrId>
    </speaker>
    <startTime>
        <weekDay>2</weekDay>
        <hour>10</hour>
        <minute>2</minute>
    </startTime>
</Presentation>
```

Notice the use of the xsi:type attribute. This is the XSD-defined attribute that allows derived types to be used in place of base types (as in the above case).

Arrays

This document utilizes array representation from the soap-encoding schema namespace to represent arrays. However, the multiple choices for the element names provided by the soap-encoding is restricted to a single choice by utilizing the anyValueElement substitution group for representing array elements. The array elements are represented as instances belonging any ValueElement substitution group. In other words, element name of an array element will always be the type name as specified by the any ValueElement substitution group thereby indicating the type of the element.

Arrays are multi-reference types. Arrays have one or more dimensions (rank) whose members are distinguished by ordinal position. An array value is represented as a series of elements reflecting the element type, with elements appearing in ascending ordinal sequence. For multi-dimensional arrays, the dimension on the right side varies most rapidly.

An Array complex type is defined in the "ts" namespace as shown in Table 25.

TABLE 25

```
<complexType name="Array">
  <complexContent>
    <sequence>
      <element ref="ts:anyValueElement" maxOccurs="unbounded"/>
    </sequence>
    <attributeGroup ref="ts:dataClassRefAttrs"/>
    <attributeGroup ref="soap-enc:arrayAttrs"/>
  </complexContent>
</complexType>
<element name="Array" type="ts:Array"
  substitutionGroup="ts:anyValueElement"/>
```

The substitution group is useful when an array appears as the element type of an array (for example, jagged arrays).

Arrays must contain the ts:arrayType attribute whose value specifies the static type of the array elements as well as the dimension(s) of the array. The ts:arrayType is defined as a global attribute in the ts namespace as follows:

<attribute name="arrayType" type="string" form="qualified"/>.

The value of the ts:arrayType attribute, in this implementation, follows the BNF syntax below:

arrayTypeName :=arrayElementType arraySize
arrayElementType :=QName (rank)*
rank :="["(",")* "]"
arraySize :="[" length ("," length?)* "]"
length :=(DIGIT)+

For example, a jagged array of length 5 whose members are of type "single dimensional array of integers" would be represented as "int[][5]". Likewise, a rectangular jagged array of dimensions 3×5 whose members are of type "two-dimensional rectangular array of integers" would be represented as "int[,][3,5]". Note that the above array definition in the ts namespace is modeled after the array definition in the soap-encoding namespace and as such is simply following SOAP encoding rules. As such, it is possible to define array definition in the ts namespace as a restriction of the array definition in the soap-encoding namespace. Again, these are merely implementation details which may vary substantially.

Array Fields

A structure or a data-class field is defined by the field name and its type, which can be an array type. Fields can be represented as elements of XSD complex type representing enclosingType.

A single-reference field of an array type that cannot be null is represented as, <element name="array field name" type="ts:Array"ts:arrayType="arrayTypeName"/>, where ts:array, ts:arrayType and arrayTypeName are as defined in the array section above.

If the above field can be null, if it is represented as:

<element name="array field name" type="ts:Array"ts:arrayType="arrayTypeName" nillable="true"/>.

A multi-reference field of an array type that cannot be null is represented as:

<element name="array field name" type="ts:reference"ts:arrayType="arrayTypeName"/>.

Note that the type has been changed from ts:Array to ts:reference in the above element declaration.

Array Example

Using these extensions, several examples of arrays are considered.

a) Given the earlier definition of the "WeekTime" class, and a class field which is of an array type "WeekTime[] today", the class field is represented as shown in Table 26.

TABLE 26

```
<element name="today" type="ts:Array" ts:arrayType="tns:WeekTime[ ]"
  nillable="true"/>
```

The actual array type information would appear as an attribute in the instance data as shown in Table 27.

TABLE 27

```
<today soap-enc:arrayType="tns:WeekTime[3]">
  <tns:WeekTime>
    <weekday>3</weekday>
    <hour>10</hour>
    <minute>0</minute>
  </tns:WeekTime>
  <tns:WeekTime>
    <weekday>3</weekday>
    <hour>12</hour>
    <minute>30</minute>
  </tns:WeekTime>
  <tns:WeekTime>
    <weekday>3</weekday>
    <hour>15</hour>
    <minute>0</minute>
  </tns:WeekTime>
</today>
``` b) Given the earlier definition of Employee and Manager, and a field which is an array of "Employees" (e.g., Employee[] devteam) that cannot be null, the field is represented as, <element name="devteam" type="ts:Array" ts:arrayType="Employee[]"/>.

The elements of the array can be "Employee" or any of its subtypes. Since "Employee" is a shared reference type, the instance data would appear as shown in Table 28. Note the use of element name to represent elements of the array.

TABLE 28

```
<devteam soap-enc:arrayType="Employee[2]">
  <tns:Manager href="#YY-ID" />
  <tns:Employee href="#XX-ID"/>
</devteam>
```

If, instead, "Employee" and "Manager" were defined as single-reference types, the instance data would appear as shown in Table 29.

TABLE 29

```
<devteam soap-enc:arrayType="tns:Employee[2]">
    <tns:Employee>
        <name>XX</name>
        <empId>1</empId>
    </tns:Employee>
    <tns:Manager>
        <name>YY</name>
        <empId>1</empId>
        <mgrId>1</mgrId>
    </tns:Manager>
</devteam>
``` c) A field which is an array of arrays (jagged array), such as "Employee [][] subteams", that cannot be null is represented as, <element name="subteams" type="ts:Array"ts:arrayType="tns:Employee[][]"/>.

As shown in Table 30, the array type information appears as an attribute in the instance data, and the element names directly indicate data elements that are of a subtype.

TABLE 30

```
<subteams soap-enc:arrayType="Employee[ ][2]">
    <ts:array href="#subteams-1-ID"/>
    <ts:array href="#subteams-2-ID"/>
</subteams>
<ts:array id="subteams-1-ID" soap-enc:arrayType="Employee[3]">
    <tns:Manager href="#YY-ID"/>
    <tns:Employee href="#XX-ID"/>
    <tns:Employee href="#ZZ-ID"/>
</ts:array>
<ts:array id="subteams-2-ID" soap-enc:arrayType="Employee[2]">
    <tns:Manager href ="#RR-ID"/>
    <tns:Employee href="#SS-ID"/>
</ts:array>
```

Data-Class Constant Values

A constant value of a simple type can be represented using the XSD "fixed" constraint. For example, the class "AA" shown in Table 31, is represented as shown in Table 32.

TABLE 31

```
class AA {
    const int c1 = 5.0;
}
```

TABLE 32

```
<complexType name="AA">
    <sequence minOccurs="0">
        <element name="c1" type="int" fixed="5"
            minOccurs="0" maxOccurs="0"/>
    </sequence>
</complexType>
```

To represent constant values of complex types, a global attribute "constantValue" is defined in the "ts" namespace as follows:

<attribute name="constantValue" type="xsd:string" form="qualified"/>.

Given the two classes shown in Table 33, the types section contains the definitions shown in Table 34.

TABLE 33

```
class BB {
    int c1;
    int c2;
}
and
class CC {
    const BB bb = new BB (5, 6);
    int c3;
}
```

TABLE 34

```
<complexType name="BB">
    <sequence . . . />
<complexType>
<element name="BB" type="tns:BB"
substitutionGroup="ts:anyValueElement"/>
<complexType name="CC">
    <sequence minOccurs="0">
        <element name="bb" type="tns:BB"
            minOccurs="0" maxOccurs="0"
                ts:constantValue="#Valuebb" />
        <element name="c3" type="xsd:int"/>
    </sequence>
</complexType>
<element name="CC" type="tns:CC"
substitutionGroup="ts:anyValueElement"/>
```

To capture the instance value referenced by the constantValue attribute, this specification defines a "values" section in the "ts" namespace that is a sibling of the wsdl "types" section. For the above example, the "ts" values section would contain the value of "bb" as shown in Table 35.

TABLE 35

```
<ts:values>
    <AA id="Valuebb">
        <c1>5</c1>
        <c2>6</c2>
    </AA>
</ts:values>
```

The "ts:constant Value" can also represent simple (primitive) types directly using the distinction that they do not start with # character, thereby avoiding the indirection. The # character is escaped when representing string values.

PortType Extensions

In this implementation, operations, representing actions and property accessors, and events are combined into logical and formally classified groups using the WSDL portType construct as shown below. There are two kinds of WSDL portTypes: a service-interface portType and a service-class portType. A service-interface portType is an abstract aggregation of methods, properties and event sources. A service-class portType is a similar aggregated construct that represents concrete implementations of zero or more service-interface portTypes plus additional methods, properties and event sources. Some service classes define fields that are accessed using FieldGetter and FieldSetter methods. In such a case, the service class will have an entry in both the <Types> section and the <portType> section. If there are no fields, then the service class is only defined within the <portType> section. However, this may vary based on the implementation.

Note that a Property construct is really just a simplified means for specifying paired get and/or set methods (operations called accessors) for a given logically-exposed data element within the context of a service-class or service-interface. Properties are therefore considered behavioral and as such are defined within <portType> section WSDL document. Properties are typically used to model the state of a Service. This specification defines a simplified syntax for specifying properties within the <portType> section.

Service-Classes

As stated above, service-class portTypes are used to formally declare aggregated units of concrete behavior that can be accessed remotely. Further service-classes support extension of a service-class's behavior via inheritance. A service-class portType is identified by the presence of a "ts:serviceClass" element in its portType definition. The "ts:serviceClass" element has two distinct types of child elements. The first, "ts:extends" points to the service-class from which the current service-class inherits. As a service-class can extend at most only one other service-class, there can only be at most one "ts:extends" element within a "ts:serviceClass" element. Of course this would vary based on the implementation. The second, "ts:implements" points to the service-interface implemented by the current service-class. As a service-class can implement zero or more service-interfaces, there can be zero or more "ts:implements" elements within a "ts:serviceClass" element. The structure is shown in Table 36,and the xsd schema for the "ts:service-Class" is shown in Table 37.

TABLE 36

```
<portType name="name">
    <ts:serviceClass>
        <ts:extends>qname</extends>?
        <ts:implements>qname</implements>*
    </ts:serviceClass>
    <operation name = "portTypeOperation"> ... </operation>
</portType>
```

TABLE 37

```
<complexType name="serviceClass">
    <sequence>
        <element name="extends" type="qname" minOccurs="0" />
        <element name="implements" type="qname" minOccurs="0"
            maxOccurs="unbounded" />
    </sequence>
</complexType>
<element name="serviceClass" type="tns:serviceClass"/>
```

Service-Interfaces

In this implementation, service-interfaces are purely abstract functionality types that can't be exposed directly; a service-interface's functionality can only be exposed via the service-class implements construct. A service-interface is a portType which describes other inherited service-interfaces, operations (properties and actions), and events. Service-interfaces are used by the standards organizations to model reusable behavior that is not necessarily bound to a particular implementation or endpoint. A service-interface is identified by the presence of "ts:serviceInterface" element in its portType definition, as shown in Table 38.The "ts:service-Interface" element has only one type of child element, "ts:extends", that points to the service-interfaces extended by the current service-interface. As a service-interface can extend zero or more service-interfaces, there can be zero or more "ts:extends" elements within a "ts:serviceInterface" element. However, this may vary based on the implementation.

TABLE 38

```
<portType name="name">
    <ts:interface>
        <extends>qname</extends>*
    </ts:interface>
    <operation name = "portTypeOperation"> ... </operation>
</portType>
```

The xsd schema for the ts:interface type is shown in Table 39.

TABLE 39

```
<complexType name="serviceInterface">
    <sequence>
        <element name="extends" type="qname" minOccurs="0"
            maxOccurs="unbounded" />
    </sequence>
</complexType>
<element name="interface" type="tns:serviceInterface" />
```

Properties

A property defines a named value and the methods to access the value. The named value is of a particular type. The property may support get and/or set methods. A set of properties are defined using the "ts:properties" element within either a "ts:serviceClass" or "ts:serviceInterface" portType. A "ts:property" element has the child elements described in Table 40.

TABLE 40

| Child Element | Description |
|---|---|
| Name | The property name is unique across all the methods and properties encapsulated within the enclosing portType. |
| Type | The property type is a qualified name referring to a type definition present in a schema namespace. Such a schema can be present in the type section of document. |
| Get and Set | These elements defines the mode of operations (accessors) allowed on the property. There are two accessors possible: a get and a set. These elements identify the operations that implement the corresponding accessors which are implicitly named with get_ or set_prefixes respectively on the associated property name when empty. The methods are required to be defined in the port type enclosing the property definition when explicitly specified. |

The "ts:properties" is defined as shown in Table 41,with the xsd schema shown in Table 42.

TABLE 41

```
<portType name="name">
    <ts:properties> ?
        <ts:property>*
            <name>nmtoken</name>
            <type>qname</type>
            <get>GetOperation?</get>?
            <set>SetOperation?</set>?
        </ts:property>
```

TABLE 41-continued

```
    </ts:properties>
    <operation name = "portTypeOperation"> ... </operation>
</portType>
```

TABLE 42

```
<complexType name="properties">
    <sequence>
        <element ref="property" minOccurs="0"
            maxOccurs="unbounded"/>
    </sequence>
</complexType>
<element name="properties" type="tns:properties"/>
<complexType name="property">
    <sequence>
        <element name="name" type="xsd:NCName" />
        <element name="type" type="xsd:QName" />
        <element name="get" type="xsd:NCName" minOccurs="0" />
        <element name="set" type="xsd:NCName" minOccurs="0" />
    </sequence>
</complexType>
<element name="property" type="tns:property"/>
```

Event Source

An event source is a named and typed entity which supports subscriptions for interested parties. When the event occurs, a value of the type specified in the eventSource is returned to the subscriber in an event notification message.

A set of event-sources are defined using the "ts:eventSources" element within either a "ts:serviceClass" or "ts:serviceInterface" portType. A "ts:EventSource" has the elements described in Table 43.

TABLE 43

| Child Element | Description |
| --- | --- |
| Name | The event source name is unique across all the methods, properties, and event sources encapsulated within the enclosing service or interface. |
| Type | The event type is a qualified name referring to a type definition present in a schema namespace. The types section can be used to define the event type. |

The "ts:eventSource" is defined as shown in Table 44, with the xsd schema for the "ts:eventSource" type shown in Table 45.

TABLE 44

```
<portType name="name">
    <ts:eventSources> ?
        <ts:eventSource>*
            <name>nmtoken</name>
            <type>qname</type>
        </ts:eventSource>
    </ts:eventSources>
    <operation name = "portTypeOperation"> ... </operation>
</portType>
```

TABLE 45

```
<complexType name="eventSources">
    <sequence>
        <element ref="eventSource" minOccurs="0"
```

TABLE 45-continued

```
            maxOccurs="unbounded"/>
    </sequence>
</complexType>
<element name="eventSources" type="tns:eventSources"/>
<complexType name="eventSource">
    <sequence>
        <element name="name" type="xsd:NCName" />
        <element name="type" type="xsd:QName" />
    </sequence>
</complexType>
<element name="eventSource" type="tns:eventSource"/>
```

Service-Class and Service-Interface Constant Values

Symbols can be given constant values in service-class and service-interface portTypes using the standard XSD element construct as follows:

<xsd:element name="symbol name" type="QName" fixed="string"ts:constantValue="string"/>.

A constant value of a simple type can be represented using the XSD fixed constraint. For example, the program segment shown in Table 46, can be represented as shown in Table 47.

TABLE 46

```
ServiceInterface AA {
    const int c1 = 5.0;
}
```

TABLE 47

```
<portType name="AA">
    <ts:serviceInterface/>
    <xsd:element name="c1" type="int" fixed="5" minOccurs="0"
        maxOccurs="0"/>
    ...
</portType>
```

XSD does not, however, define a mechanism for declaring constant values for complex data types. To support the definition of constant values of complex types, the "ts:contantValue" attribute defined in the data-classes constant value section is used. For example, a data-class containing two integers, as shown in Table 48, can be represented as shown in Table 49.

TABLE 48

```
class BB {
    int c1;
    int c2;
}
ServiceInterface CC {
    const BB bb = BB (5, 6);
}
```

TABLE 49

```
<portType name="CC">
    <ts:serviceInterface/>
    <xsd:element name="bb"
        type="tns:BB" ts:constantValue="#Valuebb"/>
    ...
</portType>
```

Further, the types section of the description would contain the definitions shown in Table 50, and the "ts:values" section of the description would contain the value of bb as shown in Table 51.

TABLE 50

```
<xsd:complexType name="BB">
    <sequence minOccurs="0">
        <element name="c1" type="xsd:int"/>
        <element name="c2" type="xsd:int"/>
    </sequence>
    <attributeGroup ref="ts:dataClassRefAttr"
</xsd:complexType>
<xsd:element name="BB" type="tns:BB"
    substitutionGroup="ts:anyValueElement"/>
```

TABLE 51

```
<ts:values>
    <AA id="Valuebb">
        <c1>5</c1>
        <c2>6</c2>
    </AA>
</ts:values>
```

Note that the id attribute of the AA element in the "ts:values" section has the same string value as the corresponding value of the "ts:constantvalue" attribute defined in the CC portType, above. Further, the "ts:constantValue" can also represent simple (primitive) types directly using the distinction that they do not start with the # character, thereby avoiding the indirection. The # character can be escaped when representing string values.

Accessing Child Services

Properties can be used to obtain the child services of a composite service. To do this, the "ts:constantValue" global attribute is used to directly obtain the location of the child service instead of accessing the property value at execution time. For example, consider the program defined in Table 52.

TABLE 52

```
ServiceClass AVService {
    readonly Tuner tuner1;
    readonly Tuner tuner2;
    ...
}
```

The child services (tuner 1 and 2) can be accessed directly using the constantValue attribute in the properties specified in the "AVService" definition as shown in Table 53.

TABLE 53

```
<ts:property>
    <name>tuner1</name>
    <type ts:constantValue="tuner1">tns:Tuner</type>
    <get>getOperation</get>
</ts:property>
<ts:property>
    <name>tuner2</name>
    <type ts:constantValue="tuner2">tns:Tuner</type>
    <get>getOperation</get>
</ts:property>
```

If for example, the "AVService" is located at "http://www.mydomain.com/AvService", the first tuner can be accessed using "http://www.mydomain.com/AvService/tuner1"

It is also possible that a service represents its child services in an array. For example, given the array definition shown in Table 54, child service-class instances can be accessed using the "ts:constanctValue" attribute value specified in the property definition shown in Table 55.

TABLE 54

```
class AVService {
    Tuner tuners[2];
    ...
}
```

TABLE 55

```
<ts:property>
    <name>tuners</name>
    <type ts:constantValue="#ValueOfTuners">ts:array</type>
    <get>getOperation</get>
</ts:property>
```

The "#ValueOfTuners" points to the relative urls contained in the "values" section as shown in Table 56.

TABLE 56

```
<ts:values>
    <ts:array id="ValueOfTuners" soap-enc:arrayType="string[2]">
        <string>tuner1<string>
        <string>tuner2<string>
    </ts:array>
</ts:values>
```

Thus, if the "AVService" is located at "http://www.mydomain.com/AvService", the first tuner can be accessed using "http://www.mydomain.com/AvService/tuner1".

Referencing a Service

To transfer a service reference across an application boundary requires information about the service such as its type and the endpoint URL. In other words, it is necessary to define a data-class that captures the relevant information on the service-class being transferred across an application boundary. Such a data-class represents the data sent over the wire and a wire-format for a service-class parameter. This document defines a multi-reference data-class called ServiceReference in the ts namespace for this purpose as shown in table 57.

TABLE 57

```
class ServiceReference {
    URI                              primaryUrl;
    singleref optional URI[ ]        alternateUrls;
    optional URI                     serviceID;
    singleref optional TypeInfo      typeInfo;
    singleref optional AnyType[ ]    extensions;
}
class TypeInfo {
    optional QName                   serviceClassName;
    optional singleref QName[ ]      extends;
    optional singleref QName[ ]      implements;
}
singleref class Extension {
    not-nillable URI                 extensionKey;
    singleref AnyType                extensionValue;
}
```

The schema for ServiceReference class is shown in Table 58.

TABLE 58

```
<complexType name="ServiceReference">
    <sequence minOccurs="0">
        <element name="primaryUrl" type="xsd:anyURI"/>
        <element name="alternateUrls" type="ts:Array" ts:arrayType="xsd:anyURI[ ]"
            minOccurs="0" maxOccurs="1" nillable="true"/>
        <element name="serviceID" type="xsd:anyURI" minOccurs="0" maxOccurs="1"
            nillable="true" />
        <element name="typeInfo" type="ts:TypeInfo" minOccurs="0" maxOccurs="1"
            nillable="true" />
        <element name="extensions" type="ts:array" ts:arrayType="xsd:anyType[ ]"
            minOccurs="0" maxOccurs="1" nillable="true" />
    </sequence>
    <attributeGroup ref="ts:dataClassRefAttrs"/>
</complexType>
<element name="ServiceReference" type="ts:ServiceReference"
        substitutionGroup="ts:anyValueElement"/>
<complexType name="TypeInfo">
    <sequence minOccurs="0">
        <element name="serviceClassName" type="xsd:QName" minOccurs="0"
            maxOccurs="1" nillable="true" />
        <element name="extends" type="ts:Array" ts:arrayType="xsd:QName[ ]"
            minOccurs="0" maxOccurs="1" nillable="true" />
        <element name="implements" type="ts:Array" ts:arrayType="xsd:QName[ ]"
            minOccurs="0" maxOccurs="1" nillable="true" />
    </sequence>
    <attributeGroup ref="ts:dataClassRefAttrs"/>
</complexType>
<element name="TypeInfo" type="ts:TypeInfo"
        substitutionGroup="ts:anyValueElement"/>
<complexType name="KeyValueExtension">
    <sequence>
        <element name="extensionKey" type="xsd:anyURI"/>
        <element name="extensionValue" type="xsd:anyType" nillable="true" />
    </sequence>
</complexType>
<element name="KeyValueExtension" type="tns:KeyValueExtension"
        substitutionGroup="ts:anyValueElement"/>
```

The "primaryUrl" field should contain the primary endpoint at which the service-class instance can be reached. A service-class instance may be available at multiple urls, especially in the case of multi-homed machines. The alternateUrls optional field allows these secondary endpoints to be published. A service reference may contain a list of types captured by the "typeInfo" field whose methods can be invoked by the clients on the remote service-class instance. However, the "typeInfo" field is optional. Of course these limitations may vary based on the implementation.

In this implementation, all service-classes are implicitly assumed to implement the "ts:IService" interface even when not specified explicitly. However, this may be varied based on the implementation. The "ts:IService" defines the following methods as shown in Table 59.

TABLE 59

```
ServiceInterface IService
{
    bool IsInstanceOf(qname type);
    TypeInfo GetTypeInfo( );
    URI GetServiceDescription( );
    string get_ServiceID( );
}
```

The IService interface supports dynamic type queries. For example, if a reference to a service-class instance location was passed as a data element to a control point, that control point could invoke the IsInstanceOf action on that service-class instance to query whether that instance implemented a particular portType, or could invoke the GetServiceDescription action to download the entire description of the service-class instance. GetTypeInfo action can be used to explicitly retrieve the TypeInfo information which can optionally be included within the ServiceReference.

In this implementation, a remotable service-class instance should support dynamic query of its type by its clients, but this may be varied. This is accomplished by implementing the architecturally defined service-interface "IService" and more specifically the "IsInstanceOf" method inside it.

If "serviceID" is present and non-null, it is a universally-unique URI meaning it provides an identity for the remote service. If "serviceID" is null or omitted, then the service does not have a serviceID. The "get_serviceID" method of IService return its serviceID.

If present, the "typeInfo" field is considered to be complete and consistent with respect to all possible invocations of the "IsInstanceOf" method. In other words, clients can always refer to the "typeInfo" field instead of invoking the "IsInstanceOf" method on the remote service-class instance. The serviceClassName element is optional as some service-class instances may choose to expose only their service-interface contracts.

Some service-class instances may want to include additional information in the service reference. To enable this scenario, service reference has an optional extensions field, which is an array of "xsd:anyType" values. Further this specification defines a standard key-value extension. The key-value extension should be ignored if the key is not understood. Future specifications could potentially define standard extensions for features such as lifetime and security. Consider a service that wants to provide a description URL and the form of encryption used. The extensions node would appear as shown in Table 60.

TABLE 60

```
<ts:extensions>
   <ts:KeyValueExtension>
      <extensionKey>http://schemas.xmlsoap.org/soap/stdexts/descUrl</extensionKey>
      <extensionValue>https://tempuri.org/foo.soap</extensionValue>
   </ts:KeyValueExtension>
   <ts:eKeyValuExtension>
      <extensionKey>http://schemas.xmlsoap.org/soap/stdexts/encryptAlg</extensionKey>
      <extensionValue> 3DES</extensionValue>
   </ts:KeyValueExtension>
</ts:extensions>
```

For example, given the service-class shown in Table 61, its service reference will be represented as shown in Table 62.

TABLE 61

```
serviceclass VendorReceiver : UPnPReceiver, IUPnPPowerControl {
   ...
};
```

TABLE 62

```
<ts:ServiceReference xmlns:vendor="http://www.vendor.com/devices"
      xmlns:upnp="...">
   <primaryUrl>http://www.foobar.com/receiver</primaryUrl>
   <alternateUrls soap-enc:arrayType="xsd:anyURI[1]">
      <xsd:anyURI>http://192.121.200.200/receiver</xsd:anyURI>*
   </alternateUrls>
   <typeInfo>
      <name>vendor:VendorReceiver</name>
      <extends soap-enc:arrayType="xsd:QName[1]">
         <xsd:QName>upnp:UPnPReceiver</xsd:QName>*
      </extends>
      <implements soap-enc:arrayType="xsd:QName[1]">
         <xsd:QName>upnp:IUPnPPowerControl</xsd:QName>*
      </implements>
   </typeInfo>
   <extensions soap-enc:arrayType="ts:anyType[1]">
      <ts:KeyValueExtension>
         <extensionKey>http://www.upnp.org/security/encryption
         </extensionKey>
         <extensionValue xsi:type="upnp:encrypt">
            <supported>true</supported>
            <supportedCipher>RC5</supportedCipher>
         </extensionValue>
      </ts:KeyValueExtension>
   </extensions>
</ts:ServiceReference>
```

Service-Class/Service-Interface Fields

A field typed as a service-class or a service-interface type can transmit a service-class reference across a communications boundary. In this implementation, a single-reference field of a service-class or service-interface type that cannot be null is represented as shown in Table 63.

TABLE 63

```
<element name="field name" type="ts:ServiceReference"
   ts:reftype="service class or interface type"/>
```

Here "ts:refType" annotation defined earlier specifies the static type of the field. The reference being transferred should be an instance of the static type of the field.

A single-reference field of a service-class or service-interface type that can be null is represented in this implementation as shown in Table 64.

TABLE 64

```
<element name="field name" type="ts:ServiceReference"
   ts:reftype="service class or interface type" nillable="true"/>
```

In this implementation, a multi-reference field of a service-class or service-interface type that can be null is represented as shown in Table 65.

TABLE 65

```
<element name="field name" type="ts:reference"
   ts:reftype="service class or interface type" nillable="true"/>
```

Note that the type has been changed from "ts:ServiceReference" to "ts:reference" in the above element declaration.

For example, the tuner field transmits a remote reference to service-class implementing ITuner service-interface in the data-class "RecieverDescription" shown in Table 66.

TABLE 66

```
class ReceiverDescription {
   singleref ITuner tuner;
};
```

As such, it would be represented as shown in Table 67.

TABLE 67

```
<complexType name="ReceiverDescription">
   <sequence minOccurs="0">
      <element name="tuner" type="ts:ServiceReference"
         reftype="tns:ITuner"
         nillable="true">
   </sequence>
   <attributeGroup ref="ts:dataClassRefAttrs"/>
</complexType>
```

FIGS. 14 and 15 contain the WSDL grammar with type extensions in bold. FIGS. 16, 17, and 18 contain the Schema for the type extensions.

FIG. 19 is an example program written in C# which includes interfaces and properties, however, the program could be written in other programming languages. FIGS. 20-21 is the WSDL with type extensions for the program in FIG. 19.

Figure 22:
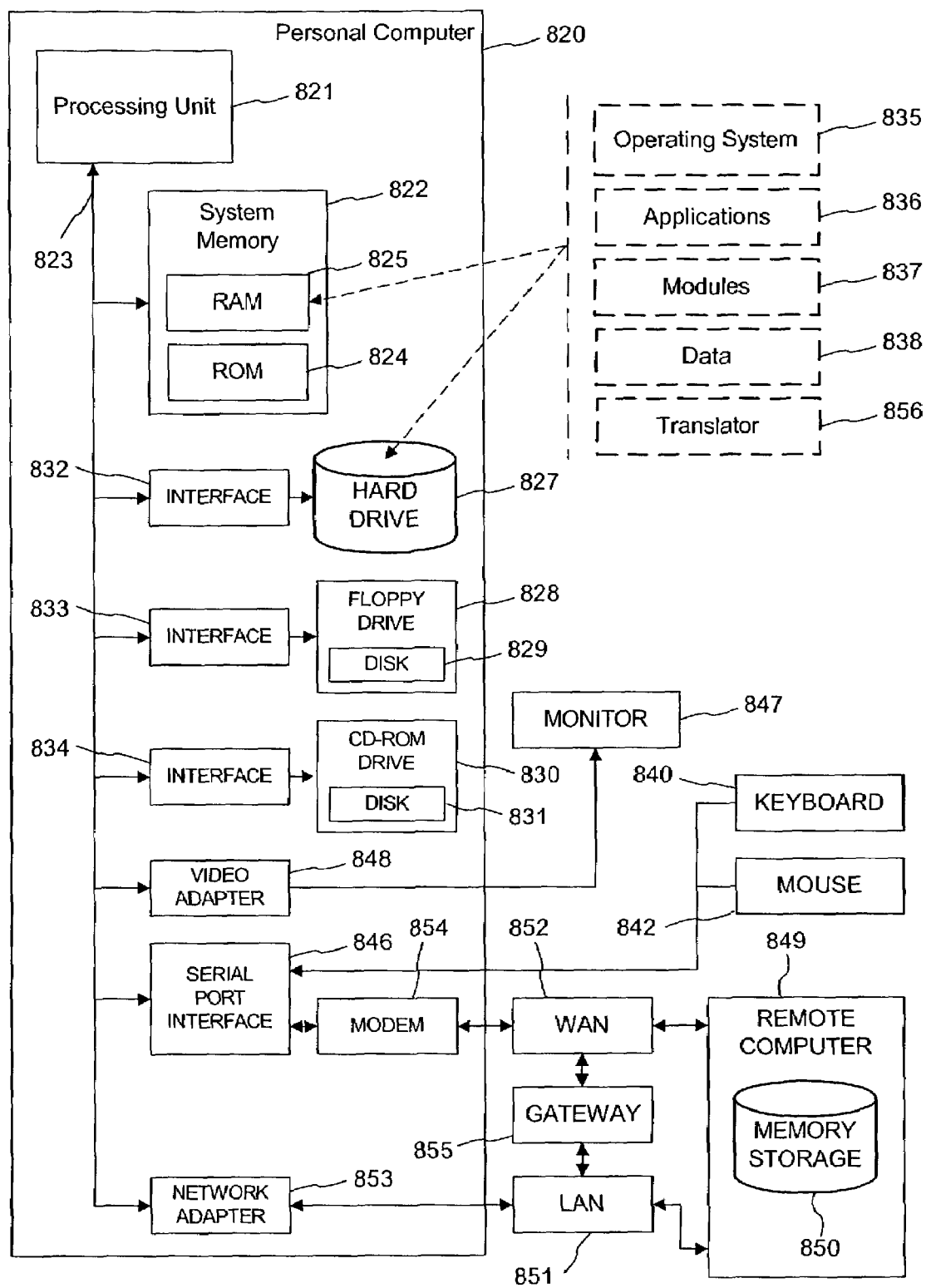
FIG. 22 is a block diagram of a computer system that may be used to implement a method, apparatus, and system embodying the web service description language with type extensions.

FIG. 22 and the following discussion are intended to provide a brief, general description of a suitable computing environment for an implementation. While the invention will be described in the general context of computer-executable instructions of a computer program that runs on a computer and/or network device, those skilled in the art will recognize that the invention also may be implemented in combination with other program modules. Generally, program modules include routines, programs, components, data structures, etc. that perform particular tasks or implement particular abstract data types. Moreover, those skilled in the arts will appreciate that the invention may be practiced with other computer system configurations, including multiprocessor systems, microprocessor-based electronics, minicomputers, mainframe computers, network appliances, wireless devices, and the like. The extensions can be practiced in networked computing environments, or on stand-alone computers.

With reference to FIG. 22, an exemplary system for implementation includes a conventional computer 820 (such as personal computers, laptops, servers, mainframes, and other variety computers) includes a processing unit 821, a system memory 822, and a system bus 823 that couples various system components including the system memory to the processing unit 821. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 821.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 824 and random access memory (RAM) 825. A basic input/output system (BIOS), containing the basic routines that help to transfer information between elements within the computer 820, such as during start-up, is stored in ROM 824.

The computer 820 further includes a hard disk drive 827, a magnetic disk drive 828, e.g., to read from or write to a removable disk 829, and an optical disk drive 830, e.g., for reading a CD-ROM disk 831 or to read from or write to other optical media. The hard disk drive 827, magnetic disk drive 828, and optical disk drive 830 are connected to the system bus 823 by a hard disk drive interface 832, a magnetic disk drive interface 833, and an optical drive interface 834, respectively. The drives and their associated computer-readable media provide nonvolatile storage of data, data structures, computer-executable instructions, etc. for the computer 820. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 825, including an operating system 835, one or more application programs 836, other program modules 837, and program data 838; in addition to an implementation 856.

A user may enter commands and information into the computer 820 through a keyboard 840 and pointing device, such as a mouse 842. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers typically include other peripheral output devices (not shown), such as speakers and printers.

The computer 820 operates in a networked environment using logical connections to one or more remote computers, such as a remote computer 849. The remote computer 849 may be a server, a router, a peer device or other common network node, and typically includes many or all of the elements described relative to the computer 820, although only a memory storage device 850 has been illustrated. The logical connections depicted include a local area network (LAN) 851 and a wide area network (WAN) 852. Such networking environments are commonplace in offices, enterprise-wide computer networks, intranets and the Internet.

When used in a LAN networking environment, the computer 820 is connected to the local network 851 through a network interface or adapter 853. When used in a WAN networking environment, the computer 820 typically includes a modem 854 or other means for establishing communications (e.g., via the LAN 851 and a gateway or proxy server 855) over the wide area network 852, such as the Internet. The modem 854, which may be internal or external, is connected to the system bus 823 via the serial port interface 846. In a networked environment, program modules depicted relative to the computer 820, or portions thereof, may be stored in the remote memory storage device. It will be appreciated that the network connections shown are exemplary and other means of establishing a communications link between the computers may be used.

Having described and illustrated the principles of our invention with reference to examples, it will be recognized that the examples can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the examples shown in software may be implemented in hardware and vice versa.

In view of the many possible implementations to which the principles of our invention may be applied, it should be recognized that any specific details are illustrative only and should not be taken as limiting the scope of our invention. Rather, we claim as our invention all that which comes within the scope and spirit of the following claims and equivalents thereto.

We claim:

1. A method for providing web services over a network according to a request for a remote service made in an extensible mark-up language expression, where the extensible mark-up language expression is formed according to an object-model agnostic web services description language with type-centric extensions, the method comprising:

receiving the extensible mark-up language expression transmitted across a communication boundary;

identifying in the extensible mark-up language expression a type extension to an existing web service description language, the type extension comprising a field name typed as a service reference, the service reference including:

a primary URL for accessing an implementation of a service class, an alternate URL for accessing the implementation of the service class, and a unique URI service reference identifier for providing an identity for the remote service;

invoking the implementation of the service class identified via the field name typed as the service reference; and sending an extensible mark up language expression indicating the results of the invoked implementation;

wherein the implementation is a request for an implementation on a typed service class described in a web services description language definition and an associated schema.

2. The method of claim 1, wherein the implementation comprises a request for other service classes supported by the service reference.

3. The method of claim 1, further comprising: identifying a mechanism for determining a type and an identity of the remote service at runtime through invoking methods on a service interface.

4. The method of claim 1 wherein further identified in the extensible mark up language expression is a typeInfo field which is used to determine type information instead of invoking an InstanceOf method on the typed service class.

5. The method of claim 1 wherein further identified in the extensible mark up language expression is an optional extension field comprising an array of values of anytype.

6. The method of claim 1 wherein further identified in the extensible mark up language expression is a service class name element.

7. The method of claim 1 wherein further identified in the extensible mark up language expression is a service interface contract.

8. The method of claim 1 wherein further identified in the extensible mark up language expression is a service interface type which is defined in the type extension as not being allowed to be null.

9. The method of claim 1 wherein further identified in the extensible mark up language expression is a service class type which is defined in the type extension as not being allowed to be null.

10. A computer readable storage medium containing data with a structure formed according to an object-model agnostic web services definition language with type-centric extensions, said structure causing a computer to perform web services according to a service request for a remote service received on a network connection, wherein the service request is made in an extensible mark-up language expression, the structure comprising:

a type extension to an existing web service description language, the type extension is identified in the extensible mark-up language expression and comprising a service reference including a binding to an implementation of a typed service class, the service reference including child elements comprising, a primary URL for accessing the implementation of the typed service class, an alternate URL for accessing the implementation of the typed service class, and a unique URI service reference identifier for providing an identity for the remote service;

wherein the computer determines the requested service from the structure, invokes the implementation of the typed service class identified via a field name typed as the service reference, and sends an extensible mark up language expression indicating the results of the invoked implementation; and wherein the implementation is a request for an implementation on a typed service class described in a web services description language definition and an associated schema.

11. The computer readable storage medium of claim 10 wherein the computer is a control point.

12. The computer readable storage medium of claim 10 wherein the type extension further comprises a typeInfo field which is used to determine type information.

13. The computer readable storage medium of claim 10 wherein the type extension further comprises an optional extension field comprising an array of values of anytype.

14. The computer readable storage medium of claim 10 wherein the type extension further comprises a service class name element.

15. The computer readable storage medium of claim 10 wherein the type extension further comprises a service interface type which is defined in the type extension as not being allowed to be null.

16. The computer readable storage medium of claim 10 wherein the type extension further comprises a service class type which is defined in the type extension as not being allowed to be null.

* * * * *